US008465576B2

(12) United States Patent
Della Valle et al.

(10) Patent No.: US 8,465,576 B2
(45) Date of Patent: Jun. 18, 2013

(54) MOBILE LAMINAR FLOW HOOD FOR USE IN PODIATRY

(75) Inventors: Francesco Della Valle, Padua (IT); Michela Rampazzo, Saonara (IT); Vanni Canton, Noventa Padovana (IT)

(73) Assignee: Epitech Group S.r.l., Milan (IT)

( * ) Notice: Subject to any disclaimer, the term of this patent is extended or adjusted under 35 U.S.C. 154(b) by 848 days.

(21) Appl. No.: 12/565,656

(22) Filed: Sep. 23, 2009

(65) Prior Publication Data

US 2010/0081368 A1 Apr. 1, 2010

(51) Int. Cl.
*B01D 46/00* (2006.01)

(52) U.S. Cl.
USPC ......... 96/224; 55/385.2; 55/467; 55/DIG. 18; 55/DIG. 29; 454/56; 454/62; 454/63; 454/67

(58) Field of Classification Search
USPC . 55/385.1, 385.2, 417, 467, DIG. 18; 454/56, 454/187, 62, 63, 67; 132/73
See application file for complete search history.

(56) References Cited

U.S. PATENT DOCUMENTS

| | | | | |
|---|---|---|---|---|
| 3,537,447 | A | 11/1970 | Gauthier et al. | |
| 3,820,536 | A * | 6/1974 | Anspach | 128/202.13 |
| 4,023,472 | A * | 5/1977 | Grunder et al. | 454/338 |
| 4,092,136 | A * | 5/1978 | Zimbardi | 96/399 |
| 5,129,928 | A | 7/1992 | Chan et al. | |
| 5,160,517 | A * | 11/1992 | Hicks et al. | 55/385.1 |
| 5,858,041 | A * | 1/1999 | Luetkemeyer | 55/385.2 |
| 6,444,002 | B1 * | 9/2002 | Mai | 55/385.1 |
| 6,626,971 | B1 * | 9/2003 | Forbert et al. | 55/385.2 |
| 6,702,662 | B2 * | 3/2004 | Kristensson | 454/187 |
| 6,916,238 | B2 * | 7/2005 | Korman | 454/187 |
| 8,066,802 | B2 * | 11/2011 | Kristensson et al. | 95/273 |
| 2002/0129710 | A1 * | 9/2002 | Ammouri | 96/58 |
| 2003/0150328 | A1 * | 8/2003 | Hansson et al. | 95/273 |
| 2004/0192186 | A1 * | 9/2004 | Bourgeois et al. | 454/187 |
| 2004/0221554 | A1 * | 11/2004 | Iijima et al. | 55/385.2 |

FOREIGN PATENT DOCUMENTS

| | | |
|---|---|---|
| DE | 3612362 | 10/1987 |
| WO | 00/04976 | 2/2000 |

OTHER PUBLICATIONS

European Search Report for 08425636.1 filed on Sep. 29, 2008 in the name of Epitech Group S.R.L.

* cited by examiner

*Primary Examiner* — Duane Smith
*Assistant Examiner* — Minh-Chau Pham
(74) *Attorney, Agent, or Firm* — Steinfl & Bruno, LLP

(57) ABSTRACT

A mobile laminar flow hood specifically devised for use in podiatry and a podiatric apparatus to which such hood is associated are described. The hood is adapted to generate a laminar flow of sterile air. In particular, an apparatus comprises a system for the generation and treatment of a laminar air flow in an intervention zone is described, together with means to support the system for the generation and treatment of a laminar air flow. The system has a blowing hood adapted to generate a laminar flow of sterile air towards the intervention zone, and a suction hood adapted to suck the laminar flow of sterile air from the intervention zone.

12 Claims, 6 Drawing Sheets

MOBILE LAMINAR FLOW HOOD FOR USE IN PODIATRY

CROSS REFERENCE TO RELATED APPLICATIONS

The present application claims priority to European Application No. 08425636.1 filed on Sep. 29, 2008, which is incorporated herein by reference in its entirety.

FIELD

The present disclosure relates to apparatuses suitable to be used in fields such as podiatry. In particular, it relates to a mobile laminar flow hood specifically devised for use in podiatry, and to a podiatric apparatus to which such hood is associated. The hood of the disclosure can be a hood adapted to generate a laminar flow of sterile air.

BACKGROUND

In the field of small interventions in patients which are performed in offices of medical centres, the problem of operating with a high degree of local sterility, in order to ensure health and safety for the patient is known.

In particular, in medical centres of podiatry, dentistry, otorhinolaryngology, gynaecology, general surgery, veterinary, etc., and in those offices in which esthetical treatments, tattoos, etc., are performed, a high degree of sterility can be desired in an extremely reduced operative area. Such need does not typically justify the extremely burdensome use of certain methods and apparatuses typically employed in the hospital operating rooms.

SUMMARY

According to embodiments of the present disclosure, an apparatus is provided which allows operating on patients with a high sterility degree, therefore with the proper safety, while not dispersing organic residues into the surrounding environment.

According to a further embodiment of the present disclosure, an apparatus is provided, capable of creating a sterile operative area which can be readily prearranged from time to time in the more suitable position for that specific need.

In several embodiments, the apparatus of the present disclosure is adapted for use in small interventions on patients at the doctor's offices and medical centres cited above.

In several embodiments, the apparatus herein described is more accessible and easily transportable compared to some devices of the art, and allows operating without the limitation of sterile cabinets having predefined dimensions.

In some embodiments, the apparatus herein described enables minimization of small organic residues that can be generated (e.g. in the form of powders) during certain kind of operation (e.g. podiatry) and that are typically dispersed in the environment by use of certain devices of the art.

Accordingly in certain embodiments, the apparatus herein described minimizes diffusion of bacterial infections or allergies that affect for example individuals, such as podiatric operator, exposed to the above-mentioned small organic residues/powders.

BRIEF DESCRIPTION OF THE DRAWINGS

In order to better understand the disclosure, non-limiting embodiments thereof are described herein below.

DESCRIPTION OF EXAMPLE EMBODIMENTS

Figure 1:
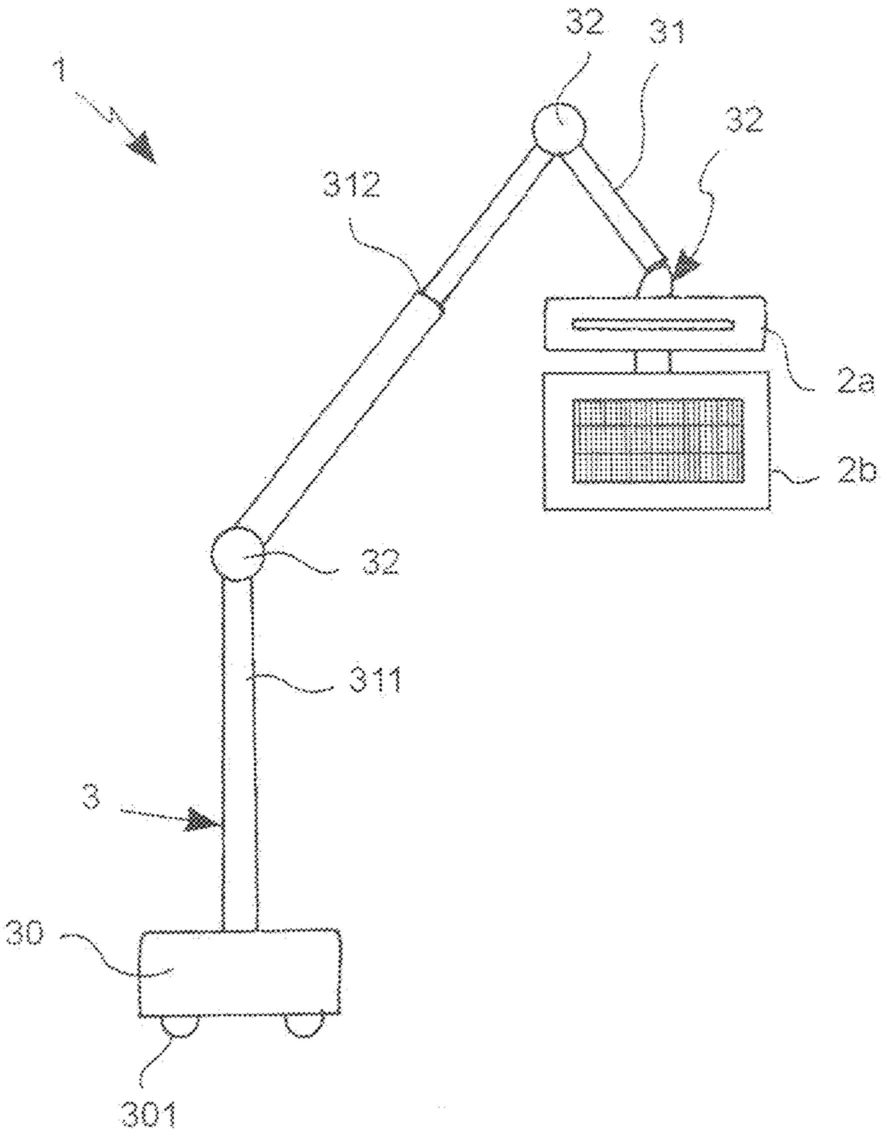
FIG. 1 represents a side top view of an embodiment of the apparatus according to an embodiment of the disclosure.

With reference to the annexed Figures, an apparatus according to an embodiment of the present disclosure is generally indicated with the reference numeral 1. The apparatus according to the embodiment comprises a blowing hood 2*a*, a suctioning hood 2*b*, and means 3 to support the hoods 2*a*, 2*b*.

The blowing hood 2*a*, the functioning principle of which is per se known, is adapted to generate a laminar flow of sterile air.

In accordance with an embodiment of the disclosure, the blowing hood 2*a* comprises a microfilter 21, for example a HEPA filter. HEPA-type filters (High Efficiency Particulate Air), are micro filtration devices the efficiency of which complies with the EN 1822 standards. A typically required efficiency for these filters is above 99.99% for particles having a diameter up to 0.3 μm. This high filtering power essentially eliminates all the contaminating agents from the air flow.

In accordance with an embodiment of the disclosure, the microfilter has an efficiency above 99.99% on particles having a diameter up to 0.3 μm. The microfilter can have an efficiency above 99.997%, so as to essentially eliminate all the contaminating agents from the air flow.

In accordance with an embodiment of the disclosure, the blowing hood 2*a* further comprises a prefilter upstream the HEPA microfilter. Such prefilter allows an easy removal and a quick replacement, and allows extending the service life of the microfilter. In accordance with an embodiment of the disclosure, the prefilter has an efficiency of about 75%.

In accordance with an embodiment of the disclosure, the blowing hood 2*a* comprises a fan motor 22, e.g., a motor causing low noise.

In accordance with an embodiment of the disclosure, the blowing hood 2*a* comprises a lighting lamp (not shown), for example, an incandescent or fluorescent lamp. The lighting lamp is adapted to illuminate the operative area hit by the laminar flow. For example, the lighting lamp can be adapted to provide a sufficient luminosity to allow safely operating.

In accordance with an embodiment of the disclosure, the blowing hood 2*a* further comprises a germicidal lamp (not shown), for example, a UV germicidal lamp.

Therefore, the blowing hood 2*a* is capable of ensuring a high degree of sterility to the operative area directly hit by the laminar flow.

The suctioning hood 2*b*, also per se known, is connected to the blowing hood 2*a* by flexible jointing means 23, such as a connecting member with coaxial rings o a swing joint connector. The suctioning hood 2*b* will be generally arranged in an essentially perpendicular position relative to the blowing hood 2*a*, but it will be able to be oriented as desired by the user by means of the flexible jointing means 23.

In a simplified form, the connecting means between blowing hood 2*a* and suctioning hood 2*b* are fixed, and consist in an L-shaped member that keeps the suctioning hood 2*b* in a perpendicular position relative to the blowing hood 2*a*.

The suctioning hood 2*b* comprises a filter 24, which can be a HEPA microfilter as the one described above, or a HEPA prefilter-microfilter system as described above.

Figure 2A:
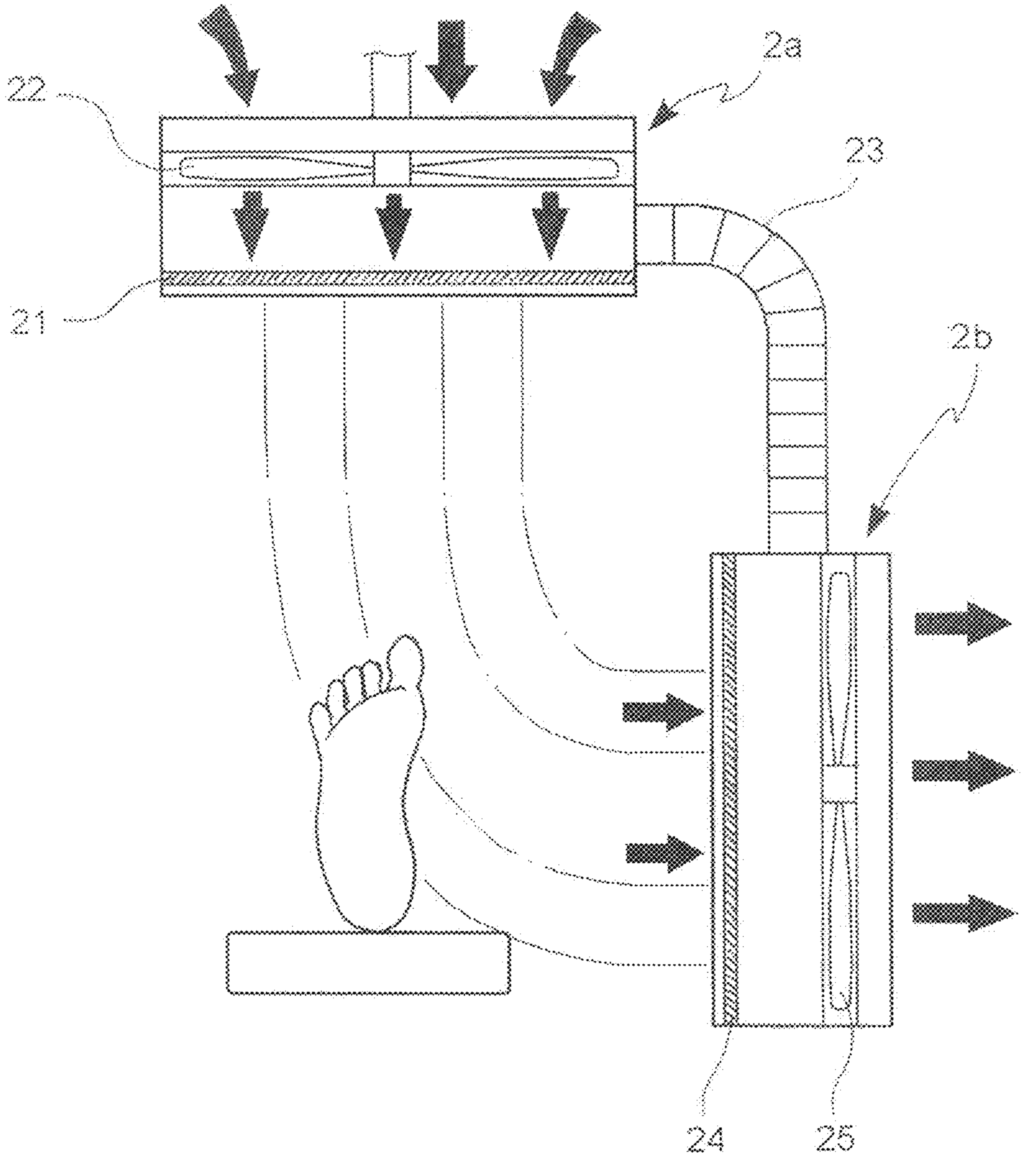
FIG. 2*a* represents a front, schematic, sectional view of the detail of the hood according to an embodiment of the disclosure.

In an embodiment (FIG. 2*a*), the suctioning hood 2*b* comprises suction means, such as a fan motor 25, which are adapted to suck air from the intervention zone and eject it to the exterior via a suitable grid which is arranged, for example, on the suctioning hood 2*b* rear part.

Figure 2B:
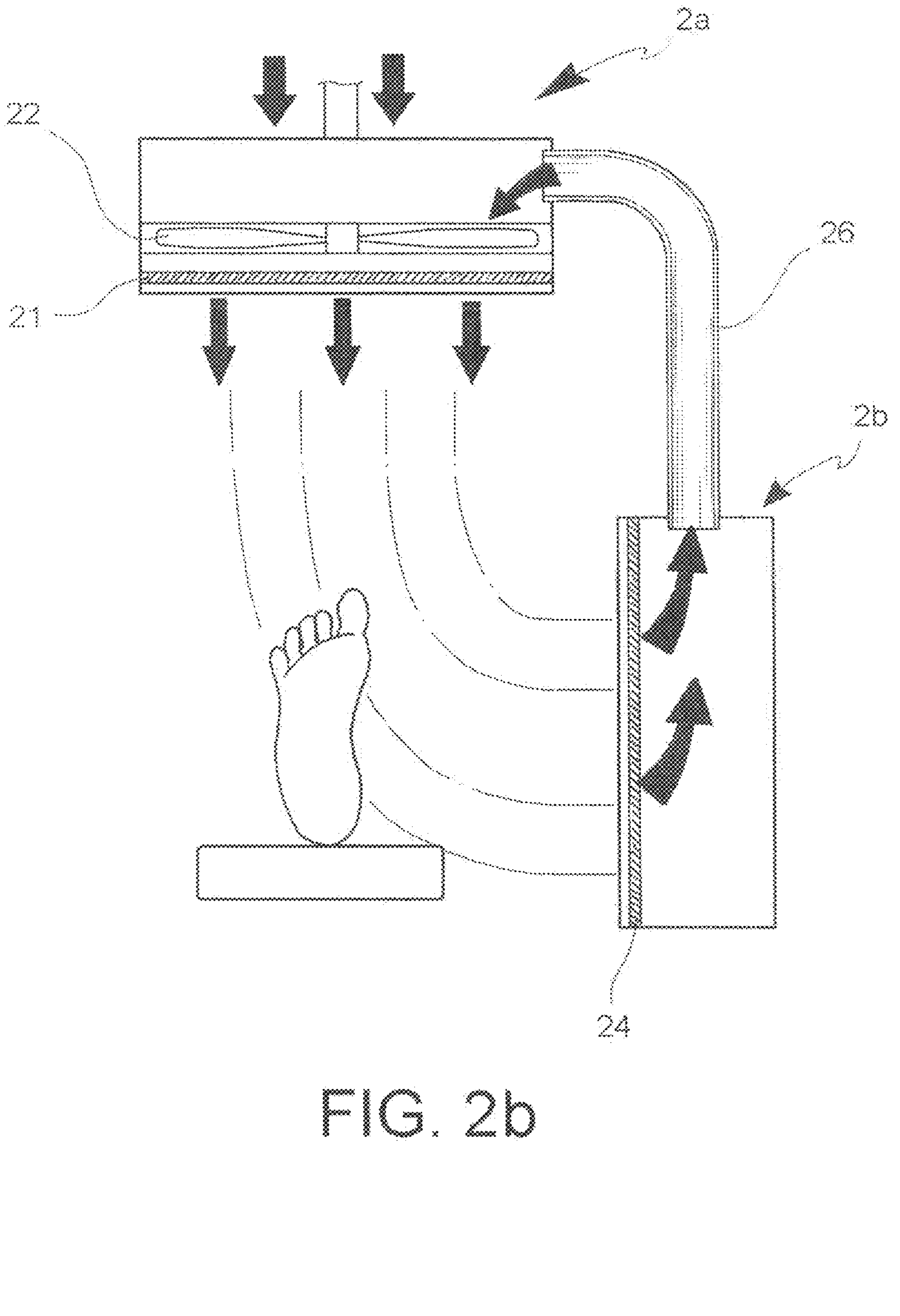
FIG. 2*b* represents a front, schematic, sectional view of the detail of the hood according to a further embodiment of the disclosure.

In a different embodiment (FIG. 2*b*), the suctioning hood 2*b* is connected to the blowing hood 2*a* through flexible o rigid connecting means 26 which put the suctioning hood 2*b*, downstream the filter 24, into flow communication with the blowing hood 2*a*, upstream the fan motor 22. In this manner, the blowing hood 2*a* fan motor 22 also acts as a suction means for the suctioning hood 2*b*, which thereby does not need suction means of its own. In such a case, the external air passage way grids in the blowing hood 2*a* will have to be suitably sized in order to properly balance the air flows.

The connecting means 26 typically consist in a rigid or flexible tube, which is adapted to maintain the suctioning hood 2*b* orientation preset by the operator.

In general, blowing hood 2*a* and suctioning hood 2*b* form a system for the generation and treatment of a laminar air flow in the intervention zone.

The support means 3 shown in the Figures are directly connected to the blowing hood 2*a*, but nothing prevents their connection to the suctioning hood 2*b* as an alternative, according to the apparatus constructive needs. The support means 3 are adapted to allow the adjustment of the same blowing hood 2*a* positioning and the adjustment of said laminar flow orientation. At the same time, the support means 3 are adapted to ensure the stability of the blowing hood 2*a* positioning and the laminar flow orientation.

By the term 'stability' is meant, herein and below, that the hood positioning and the flow orientation do not accidentally vary under the action of the typical loads acting on a hood during the use thereof.

In particular, the support means 3 are adapted so that the hood positioning and orientation do not vary under the action of the intrinsic weight of the hood, under the action of the reaction force created by the air flow ejection, under the action of the force that the operator has to apply in order to actuate the optional controls arranged on the same hood, etc.

The support means 3 allow the user positioning the blowing hood 2*a* within the medical centre, office, or laboratory at will. The support means 3 further allow arranging the blowing hood 2*a* in such a manner as to orientate the laminar flow produced by it in the direction desired by the operator. Finally, the support means 3 allow stably keeping the blowing hood 2*a*, and, as a consequence, the suctioning hood 2*b*, in the desired position, and stably keeping the laminar flow in the desired direction.

As it can be appreciated in view of the description heretofore reported, the apparatus 1 according to the disclosure is particularly adapted for use in medical centres, offices, or laboratories in which a high degree of sterility is required in a limited operative area, but which cannot be decided in advance, and which can be variously located.

A possible use of the apparatus 1 according to the disclosure is the use in offices or medical centres where small interventions are performed on patients, requiring a high degree of local sterility. In particular, the apparatus 1 has been devised for podiatric interventions.

Other possible uses of the apparatus 1 according to the disclosure are those in those laboratories where samples are being treated, having such dimensions as to not be capable of being introduced into a conventional sterile laminar flow cabinet.

In accordance with an embodiment of the disclosure, the support means 3 comprise a base 30 and a series of shafts 31 connected by joints 32.

The base 30 is so manufactured as to ensure a high stability of the apparatus, for example, by comprising a large rest surface (see FIGS. 3 and 4), or by comprising a ballast, or anchoring means, or the like.

In accordance with an embodiment of the disclosure, the base 30 comprises mobility means 301 adapted to provide a high ease to the base 30 movement during the apparatus 1 handling step. Such means 301 can comprise wheels, rolls, spheres, or the like.

In accordance with an embodiment of the disclosure, the base 30 comprises detent means 302 which are adapted to increment the stability and to limit the mobility of the base 30 once the apparatus 1 handling step has been completed. The detent means 302 can, for example, comprise retainers adapted to act on the surface on which the base 30 is mobile, or brackets adapted to act on the mobility means 301, where present.

Shafts 31 and joints 32 are so implemented as to confer the blowing hood 2*a* all degrees of freedom which are deemed to be necessary in the specific case.

With reference, for example, to FIG. 1, a fixed length shaft 311, and a telescopic shaft 312 are employed. Such solution allows, once the apparatus 1 base 30 has been secured, achieving a blowing hood 2 translation along the telescopic shaft 312 direction.

Figure 4:
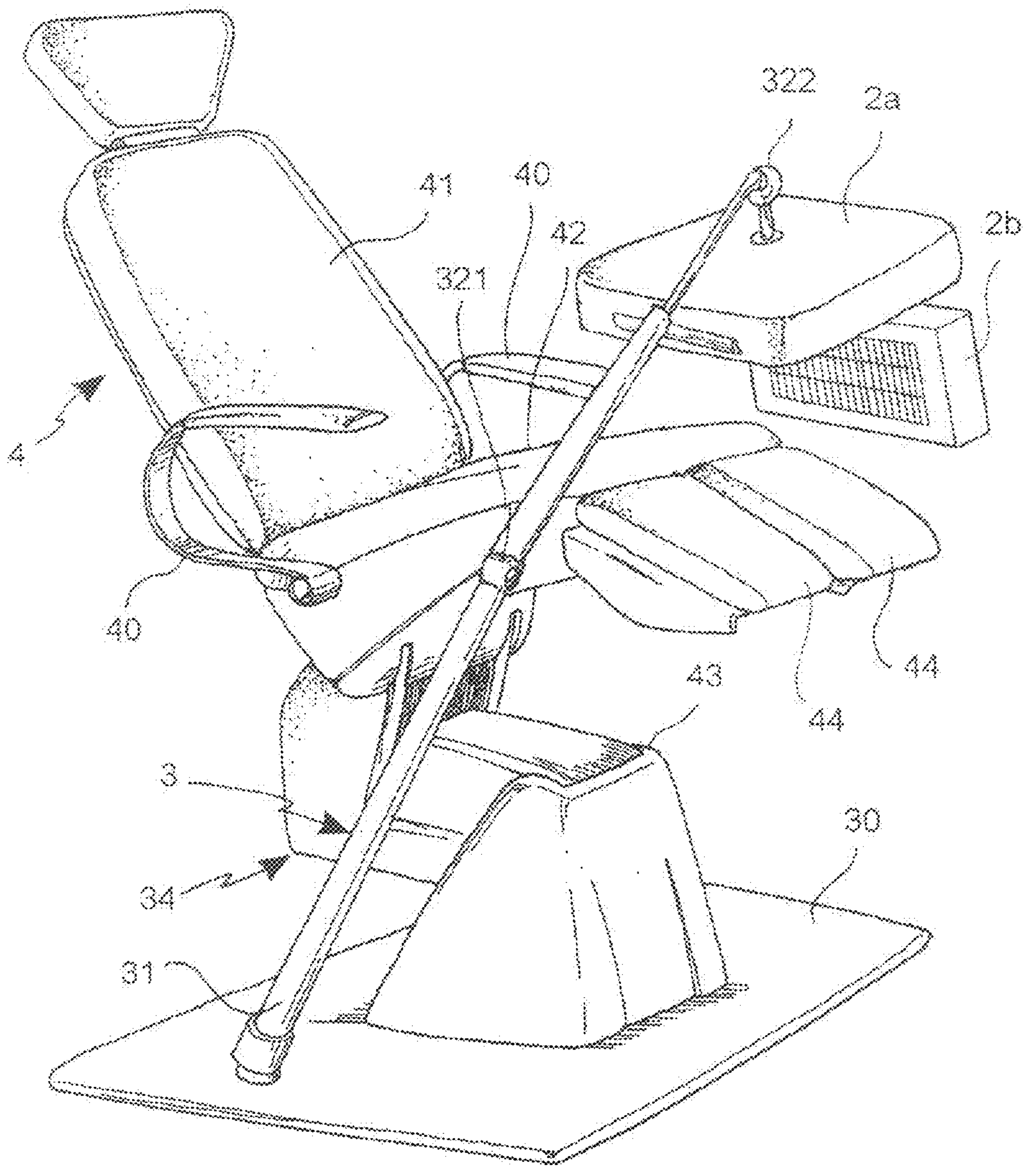
FIG. 4 represents a perspective view of a variation of the apparatus in FIG. 3.

With reference, for example, to FIG. 4, a planar hinge joint 321, and a ball and socket hinge joint 322 are employed.

The planar hinge joint 321 allows the two arms connected thereto a relative rotation around a hinge axis. In other words, the planar hinge joint 321 allows obtaining a hood 2*a* rotation around the hinge axis, which is perpendicular to the directions of the two shafts connected to the hinge 321.

Instead, the ball and socket hinge joint 322 allows the two arms connected thereto any relative rotations in the space, around a hinge centre. In other words, the ball and socket hinge joint 322 allows obtaining a hood 2*a* rotation around the hinge centre.

In another embodiment of the disclosure, a box coupling can be employed. The box coupling allows a rotation around the shaft 31 axis to which it is connected. In other words, the box coupling allows obtaining a hood 2*a* rotation around the shaft axis connected to the joint.

As one skilled in the art will easily understand, the blowing hood 2*a* which is arranged at the end of one shafts 31 and joints 32 chain enjoys the sum of all the degrees of freedom given by each shaft 31 and each joint 32.

In accordance with an embodiment of the disclosure, the telescopic shafts and the joints comprise means to continuously putting up a predetermined resistance to the movement, so as to prevent undesired movements under the action of the typical loads acting on the blowing hood 2*a* during the use thereof.

Such means can, for example, comprise systems to obtain a discrete step movement, for example, snap systems defining predefined successive stabile balance positions.

In accordance with another embodiment of the disclosure, the telescopic shafts 312 and the hinge joints 32 comprise means to increment and/or decrease the resistance they oppose to the movement.

Such means can, for example, comprise screw tightening ring nuts.

In accordance with an embodiment of the disclosure, the apparatus 1 according to the disclosure further comprises a furnishing item adapted for use in the medical centre, office, or laboratory.

In accordance with an embodiment of the disclosure, such furnishing item is an armchair or bed 4 adapted to receive a patient. In the specific embodiments represented in FIGS. 3 and 4, the armchair 4 and the blowing hood 2*a* (to which the suctioning hood 2*b* is connected) share the base 30.

Figure 3:
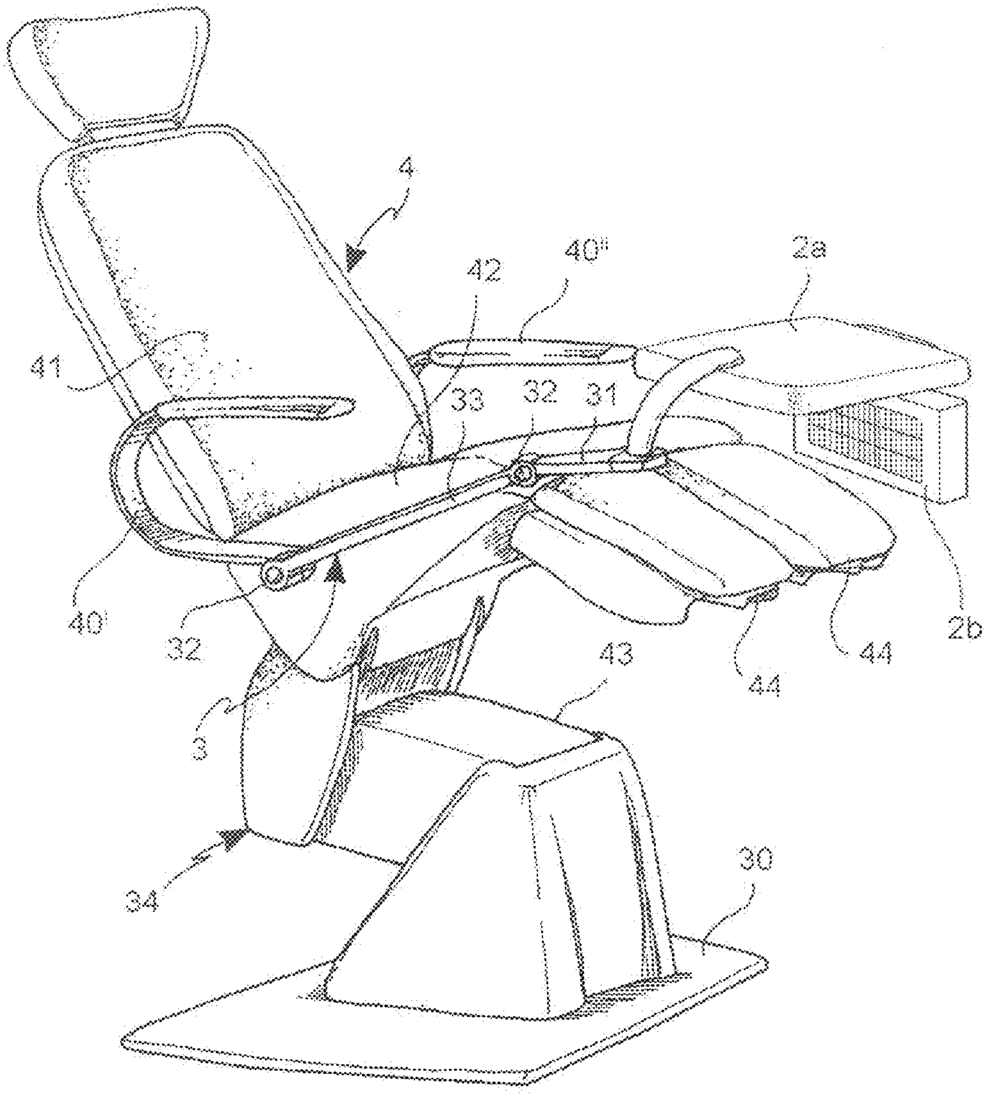
FIG. 3 represents a perspective view of an apparatus according to the present disclosure.

In particular, in the embodiment of FIG. 3, support means 3 and armchair 4 share the structure 34 which from the base 30 extends to the level of an arm rest 40.

Instead, in the embodiment of FIG. 4, the support means 3 extend from the base 30 independently from the armchair 4.

In these embodiments, the positioning stability of the blowing hood 2 takes advantage from the base 30 width, and from the overall mass weighting down on it, thus making it particularly firm. In fact, such mass comprises the armchair mass and, when the apparatus 1 is in use, the patient mass.

In the embodiments of the apparatus 1 represented in the FIGS. 3 and 4, the armchair 4 is of the type conventionally used in the podiatric medical centres. Such armchair generally comprises means for patient handling. The patient handling means can comprise, for example, a reclinable backrest 41, a rocking seat 42, a mechanism 43 adapted to lift the whole armchair 4. The armchair represented in the FIGS. 3 and 4 further comprises two legrests 44 adapted to raise and lower the patient's legs, one independently to the other.

In the embodiment of FIG. 3, in which support means 3 and armchair 4 share part of the structure, the arm rest 40' from which the support means 3 extend is fixed relative to the armchair 4. In fact, the patient is unable to access and leave the armchair 4 from the side carrying the support means 3. Instead, the opposite arm rest 40" is mobile, in order to aid access to and rising from the armchair.

In accordance with other possible embodiments of the apparatus 1 according to the disclosure, the armchair or bed can be of a different type, for example, of the type used in the medical centres of dentistry, otorhinolaryngology, gynaecology, general surgery, veterinary, etc.

In accordance with further possible embodiments of the apparatus 1 according to the disclosure, the armchair or bed can still be of a different type, for example, of the type used in the offices where aesthetical treatments, tattoos, etc., are carried out.

Figure 5:
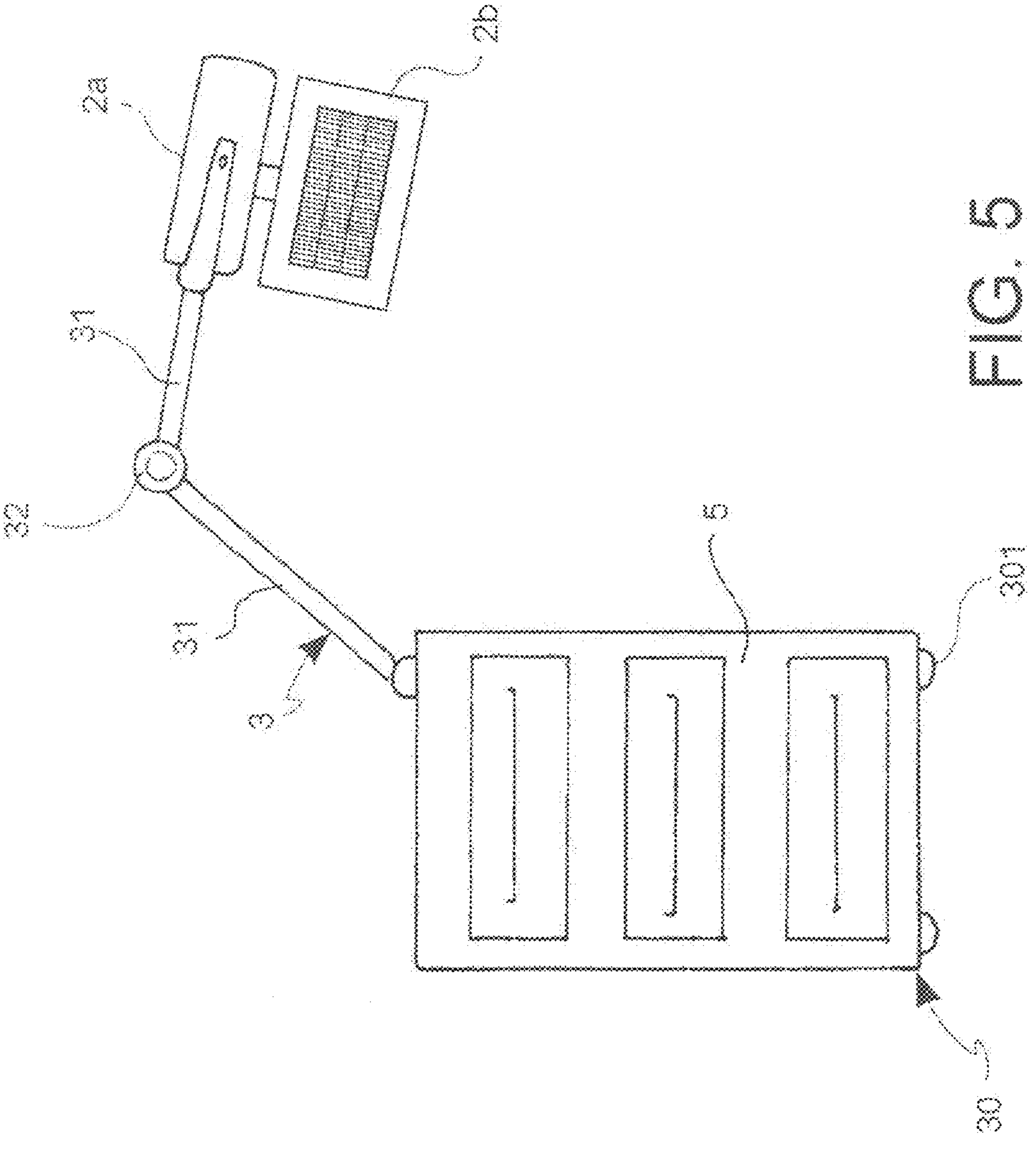
FIG. 5 represents a side view of a further embodiment of the apparatus according to the disclosure.

In accordance with the embodiment represented in FIG. 5, the furnishing item included in the apparatus 1 according to the disclosure is a closet 5, for example, provided with drawers and shelves in order to put the instruments in use in the medical centre, office, or laboratory back.

Such embodiment allows, similarly to those in FIGS. 3 and 4, taking advantage of the mass of the furnishing item and the instruments contained therein, in order to confer stability to the support means 3. Furthermore, when the blowing hood is not in use, the apparatus 1 can take a retracted configuration, which requires slightly more room compared to the room needed by a standard closet to shelve instruments.

As those skilled in the art will be certainly able to appreciate from the description reported above, the apparatus 1 according to the invention allows locally obtaining a high level of sterility, so as to be able to operate on patients with the proper safety. Thanks to the provision of the suctioning hood 2*b*, there is no dispersion into the environment of the organic residues optionally originating during the intervention (epidermis flakes or fragments and callous tissue, nails, etc.), which allows confining the intervention zone to the protection of both the environment and the operator.

Furthermore, the apparatus 1 according to the disclosure provides a system for the generation and treatment of air, composed of the blowing hood 2*a*—suctioning hood 2*b* unit, which can be easily arranged in the most suitable position from time to time for the specific need, and the laminar flow of which can be easily arranged from time to time in the most suitable orientation for the specific need.

In the following, a method of use of the apparatus 1 is described below, in accordance with a further embodiment of the disclosure.

First, the operator has to identify the area of the patient's body on which it is necessary to operate.

Then, the operator generates the sterile air laminar flow by means of the blowing hood 2*a*.

Then, the operator selects a blowing hood 2*a* positioning and, optionally, of the suctioning hood 2*b* positioning, and adjusts the laminar flow orientation so that the same laminar flow hits the area of the patient's body identified before.

Then, the operator makes the blowing hood 2*a* and the suctioning hood 2*b* positioning, and the laminar flow orientation, stable through said support means 3.

Finally, the operator can safely operate on the area of the patient's body identified before.

It shall be apparent that to the apparatus 1 according to the present disclosure, one of ordinary skill in the art, with the aim of meeting contingent, specific needs will be able to make further modifications and variations, all anyhow falling within in the protection scope of the invention, as defined by the following claims.

The examples set forth above are provided to give those of ordinary skill in the art a complete disclosure and description of how to make and use the embodiments of the mobile laminar flow hood of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) in the Background, Summary, and Description of Example Embodiments is hereby incorporated herein by reference.

It is to be understood that the disclosures are not limited to particular equipment, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Although any methods and materials similar or equivalent to those described herein can be used in the practice for testing the apparatus of the disclosure, specific examples of appropriate materials and methods are described herein.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. An apparatus comprising a system for generation and treatment of a laminar air flow in an intervention zone; and support means to support said system, wherein said system comprises:

a blowing hood comprising a fan motor, the blowing hood being adapted to generate a laminar flow of sterile air towards said intervention zone, a suctioning hood comprising suction means functionally separate from said fan motor, the suctioning hood being adapted to suck from said intervention zone said laminar flow of sterile air, said suctioning hood further comprising an opening for ejection of sucked air to the environment, and flexible or rigid connecting means connecting said suctioning hood to said blowing hood, said flexible or rigid connecting means being configured to position said suctioning hood relative to said blowing hood without establishing a flow communication between said suctioning hood and said blowing hood.

2. The apparatus according to claim 1, wherein said support means are adapted to allow adjustment of positioning of said blowing hood and adjustment of said laminar flow orientation, and are further adapted to ensure stability of said positioning and said orientation.

3. The apparatus according to claim 1, wherein said blowing hood and/or said suctioning hood comprise a HEPA microfilter.

4. The apparatus according to claim 3, wherein said microfilter has an efficiency above 99.99% on particles having a diameter up to 0.3 μm.

5. The apparatus according to claim 3, wherein said blowing hood and/or said suctioning hood comprise a prefilter arranged upstream of said HEPA microfilter, and having an efficiency of about 75%.

6. The apparatus according to claim 1, wherein said blowing hood comprises a low noise fan motor.

7. The apparatus according to claim 1, wherein said blowing hood comprises a lighting lamp.

8. The apparatus according to claim 1, wherein said blowing hood comprises a UV germicidal lamp.

9. The apparatus according to claim 1, wherein said connecting means are configured to arrange said suctioning hood in an essentially perpendicular position relative to said blowing hood, said system for the generation and treatment of the laminar air flow taking an essentially L-shaped configuration.

10. The apparatus according to claim 1, wherein said support means comprise a base and a plurality of shafts connected through joints, and wherein said base comprises mobility means adapted to aid the base movement during a handling step of said apparatus, optionally comprising detent means adapted to limit the base mobility once a handling step of said apparatus has been completed.

11. The apparatus according to claim 10, wherein said plurality of shafts comprises at least one telescopic shaft and in which said plurality of joints comprises at least one planar hinge joint, and at least one ball and socket hinge joint, and/or at least one box coupling, and in which said telescopic shafts and said joints comprise means to constantly oppose a predetermined resistance to the movement.

12. The apparatus according to claim 1, comprising a podiatric armchair and in which said support means are directly connected to said podiatric armchair.

* * * * *